(12) United States Patent
Gao et al.

(10) Patent No.: US 10,827,518 B2
(45) Date of Patent: Nov. 3, 2020

(54) UPLINK TRANSMISSION METHOD AND DEVICE

(71) Applicant: CHINA ACADEMY OF TELECOMMUNICATIONS TECHNOLOGY, Beijing (CN)

(72) Inventors: Xuejuan Gao, Beijing (CN); Fangchen Cheng, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 63 days.

(21) Appl. No.: 16/072,809

(22) PCT Filed: Jan. 12, 2017

(86) PCT No.: PCT/CN2017/070938
§ 371 (c)(1),
(2) Date: Jul. 25, 2018

(87) PCT Pub. No.: WO2017/133413
PCT Pub. Date: Aug. 10, 2017

(65) Prior Publication Data
US 2019/0069320 A1    Feb. 28, 2019

(30) Foreign Application Priority Data
Feb. 3, 2016  (CN) .......................... 2016 1 0076706

(51) Int. Cl.
*H04W 72/12*  (2009.01)
*H04W 72/14*  (2009.01)
(Continued)

(52) U.S. Cl.
CPC ....... *H04W 72/14* (2013.01); *H04W 72/1284* (2013.01); *H04W 72/042* (2013.01);
(Continued)

(58) Field of Classification Search
None
See application file for complete search history.

(56) References Cited

U.S. PATENT DOCUMENTS

2009/0046605 A1   2/2009  Gao et al.
2013/0044727 A1*  2/2013  Nory ..................... H04L 5/0092
                                                                370/330
(Continued)

FOREIGN PATENT DOCUMENTS

CN      101478829 A     7/2009
CN      101499894 A     8/2009
(Continued)

OTHER PUBLICATIONS

First Office Action and Search Report from CN app. No. 201610076706.5, dated Mar. 26, 2019 with English translation from Global Dossier.
(Continued)

*Primary Examiner* — Duc T Duong
(74) *Attorney, Agent, or Firm* — Ladas & Parry, LLP

(57) ABSTRACT

An uplink transmission method and an uplink transmission device are provided. The uplink transmission method includes: detecting an UL grant on a target time-domain resource and a target frequency-domain resource in a first time unit, the UL grant being to schedule one or more UEs to perform uplink transmission in a target time unit, a time unit having a predefined length of B1 subframes or B2 symbols, where B1 and B2 are each an integer greater than or equal to 1; acquiring scheduling information for the UE in the target time unit from the UL grant; and performing the uplink transmission on a time-domain resource and a frequency-domain resource scheduled in the target time unit in accordance with the scheduling information.

18 Claims, 5 Drawing Sheets

(51) Int. Cl.
*H04W 72/04* (2009.01)
*H04W 92/20* (2009.01)

(52) U.S. Cl.
CPC .... *H04W 72/0446* (2013.01); *H04W 72/0453* (2013.01); *H04W 92/20* (2013.01)

(56) References Cited

U.S. PATENT DOCUMENTS

| | | | |
|---|---|---|---|
| 2013/0083766 A1* | 4/2013 | Chung | H04W 72/0413 370/329 |
| 2013/0201899 A1* | 8/2013 | Yuan | H04L 5/0053 370/315 |
| 2014/0022964 A1 | 1/2014 | Guan et al. | |
| 2014/0098754 A1* | 4/2014 | Luo | H04L 5/0053 370/329 |
| 2014/0177491 A1 | 6/2014 | Hao et al. | |
| 2014/0307567 A1 | 10/2014 | Li et al. | |
| 2014/0314031 A1 | 10/2014 | Kim et al. | |
| 2014/0348098 A1* | 11/2014 | Lee | H04L 5/1469 370/329 |
| 2015/0110026 A1 | 4/2015 | Lee et al. | |
| 2015/0201345 A1* | 7/2015 | Zhang | H04L 43/0817 370/252 |
| 2015/0327229 A1 | 11/2015 | Zhang et al. | |
| 2015/0334685 A1* | 11/2015 | Ji | H04W 72/1247 370/330 |
| 2016/0057741 A1 | 2/2016 | Seo et al. | |
| 2016/0262188 A1* | 9/2016 | Zhang | H04W 74/0808 |
| 2017/0026297 A1* | 1/2017 | Sun | H04L 47/25 |
| 2017/0135105 A1 | 5/2017 | Li et al. | |
| 2018/0035430 A1* | 2/2018 | Futaki | H04L 1/0041 |
| 2018/0206249 A1* | 7/2018 | Hu | H04W 72/042 |
| 2019/0289605 A1* | 9/2019 | Futaki | H04L 5/0044 |
| 2019/0357190 A1* | 11/2019 | Park | H04L 5/0092 |

FOREIGN PATENT DOCUMENTS

| | | |
|---|---|---|
| CN | 101729128 A | 6/2010 |
| CN | 102082641 A | 6/2011 |
| CN | 102082642 A | 6/2011 |
| CN | 102355731 A | 2/2012 |
| CN | 103313380 A | 9/2013 |
| CN | 103368708 A | 10/2013 |
| CN | 104104486 A | 10/2014 |
| CN | 104821867 A | 8/2015 |
| CN | 105099634 A | 11/2015 |
| JP | 2012005035 A | 1/2012 |
| KR | 20140084140 A | 7/2014 |
| WO | 2013170640 A1 | 11/2013 |
| WO | 2014163415 A1 | 10/2014 |
| WO | 2014208924 A1 | 12/2014 |

OTHER PUBLICATIONS

Notice of Reasons for Refusal from JP app. No. 2018540099, dated May 28, 2019, with English translation.
"Discussion on specification impact for latency reduction techniques", 3GPP TSG RAN WG1 Meeting #83, Anaheim, USA, Nov. 16-20, 2015.
"Text proposal capturing outcome of email discussion: [91bis#34][LTE/LATRED] CB-PUSCH", 3GPP TSG-RAN WG2 #92, Anaheim, USA, Nov. 16-20, 2015.
From EP App. No. 17746733.9, Extended European Search Report dated Dec. 14, 2018.
From PCT/CN2017/070938, Written Opinion of the International Searching Authority, dated Apr. 1, 2017, with English translation provided by WIPO.
From PCT/CN2017/070938, International Preliminary Report on Patentability, dated Aug. 7, 2018 with English translation provided by WIPO.
"TDD aspects of downlink control signaling", TSG-RAN WG1 LTE Ad Hoc, Beijing, China, Apr. 17-20, 2007.
"HARQ and Scheduling in TDD Uplink", 3GPP TSG-RAN WG21459bls, Shanghai, China, Oct. 8-12, 2007.
International Search Report for PCT/CN2017/070938 dated Apr. 1, 2017 and its English translation provided by WIPO.
Written Opinion of the International Search Authority PCT/CN2017/070938 dated Apr. 1, 2017 and its English translation provided by Google Translate.
Notification of Reason for Refusal from KR app. No. 10-2018-7025264, dated Dec. 3, 2019, with English translation from KIPO.

* cited by examiner

UPLINK TRANSMISSION METHOD AND DEVICE

CROSS-REFERENCE TO RELATED APPLICATION

The present application is the U.S. national phase of PCT Application PCT/CN2017/070938 filed on Jan. 12, 2017 which claims the priority to Chinese patent application No. 201610076706.5 filed on Feb. 3, 2016, the disclosures of which are incorporated herein by reference in their entireties.

TECHNICAL FIELD

The present disclosure relates to the field of communication technology, in particular to an uplink transmission method and an uplink transmission device.

BACKGROUND

FIG. 1 shows a frame structure type 1 (FS1) adopted by a Long Term Evolution (LTE) Frequency-Division Duplexing (FDD) system. In the FDD system, a carrier frequency for uplink transmission is different from that for downlink transmission, while the frame structure for the uplink transmission is the same as that for the downlink transmission. On each carrier, a radio frame with a length of 10 ms contains 10 subframes each with a length of 1 ms, and each subframe contains a slot with a length of 0.5 ms. A Transmission Time Interval (TTI) for the transmission of uplink data and downlink data is 1 ms.

FIG. 2 shows a frame structure type 2 (FS2) adopted by a conventional LTE Time-Division Duplexing (TDD) system. In the TDD system, different subframes or different slots at a same frequency are used for the uplink and downlink transmissions. In FS2, each radio frame with a length of 10 ms contains two half-frames each with a length of 5 ms. Each half-frame contains five subframes each with a length of 1 ms. The subframes in FS2 include downlink subframes, uplink subframes and special subframes. Each special subframe includes a Downlink Pilot Time Slot (DwPTS), a Guard Period (GP) and an Uplink Pilot Time Slot (UpPTS). The DwPTS is used for the transmission of downlink pilot signal, downlink service data and downlink control signaling. The GP is not used for the transmission of any signal. The UpPTS is merely used for the transmission of a random access channel and a Sounding Reference Symbol (SRS), rather than for the transmission of uplink services or uplink control information. Each half-frame includes at least one downlink subframe, at least one uplink subframe and at most one special subframe. Table I shows seven uplink/downlink subframe configurations in FS2.

TABLE 1

| Uplink/downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A time delay at a User Plane of the LTE system consists of a processing time at a base station, a frame alignment time, the TTI and a processing time at a User Equipment (UE). The frame alignment time is a waiting time taken by a service until the service is capable of being transmitted via an air-interface subframe.

Taking the LTE-FDD downlink transmission as an example, each subframe in the FDD system has an opportunity for the downlink transmission, so an average frame alignment time is 0.5 ms. The processing time at the base station is 1 ms in a downlink direction and 1.5 ms in an uplink direction. The processing time at the UE is 1 ms in the uplink direction and 1.5 ms in the downlink direction. Hence, in the case of not taking a Hybrid Automatic Repeat reQuest (HARQ) into consideration, the time delay at the User Plane for the LTE-FDD downlink transmission is equal to a sum of the processing time at the base station (1 ms), the frame alignment time (0.5 ms), the TTI (1 m) and the processing time at the UE (1.5 ms), i.e., totally 4 ms. Similarly, in the case of not taking the HARQ into consideration, the time delay at the User Plane for the LTE-FDD uplink transmission is also 4 ms, as shown in FIG. 3.

For the LTE-TDD system, the processing time at the base station, the processing time at the UE and the TTI are the same as that in the LTE-FDD system, as shown in FIGS. 4 and 5. The frame alignment time is related to a service arrival time and the uplink/downlink configuration adopted by the system. Taking an uplink/downlink configuration #5 as an example, when the processing is completed by the base station within subframe #1, the data may be transmitted as early as within subframe #3. At this time, the average frame alignment time for the air-interface subframe is 1.5 ms, and the average frame alignment time for the other subframes is 0.5 ms, so the average frame alignment time for the downlink data is (1.5+8*0.5)/9=0.6 ms. In the case of not taking the HARQ into consideration, Tables 2 and 3 show the average time delays at the downlink (DL) User Plane and the Uplink (UL) User Plane for the TDD uplink/downlink configurations.

TABLE 2

| Step | Description | UL/DL configuration | | | | | | |
| --- | --- | --- | --- | --- | --- | --- | --- | --- |
| | | 0 | 1 | 2 | 3 | 4 | 5 | 6 |
| 1 | Processing time delay at base station | 1 ms | 1 ms | 1 ms | 1 ms | 1 ms | 1 ms | 1 ms |
| 2 | Frame alignment | 1.7 ms | 1.1 ms | 0.7 ms | 1.1 ms | 0.8 ms | 0.6 ms | 1.4 ms |
| 3 | TTI | 1 ms | 1 ms | 1 ms | 1 ms | 1 ms | 1 ms | 1 ms |
| 4 | Processing time delay at UE | 1.5 ms | 1.5 ms | 1.5 ms | 1.5 ms | 1.5 ms | 1.5 ms | 1.5 ms |
| | Total one-way time delay | 5.2 ms | 4.6 ms | 4.2 ms | 4.6 ms | 4.3 ms | 4.1 ms | 4.9 ms |

TABLE 3

| Step | Description | UL/DL configuration | | | | | | |
| --- | --- | --- | --- | --- | --- | --- | --- | --- |
| | | 0 | 1 | 2 | 3 | 4 | 5 | 6 |
| 1 | Processing time delay at base station | 1 ms | 1 ms | 1 ms | 1 ms | 1 ms | 1 ms | 1 ms |
| 2 | Frame alignment | 1.1 ms | 1.7 ms | 2.5 ms | 3.3 ms | 4.1 ms | 5 ms | 1.4 ms |
| 3 | TTI | 1 ms | 1 ms | 1 ms | 1 ms | 1 ms | 1 ms | 1 ms |
| 4 | Processing time delay at UE | 1.5 ms | 1.5 ms | 1.5 ms | 1.5 ms | 1.5 ms | 1.5 ms | 1.5 ms |
| | Total one-way time delay | 4.6 ms | 5.2 ms | 6 ms | 6.8 ms | 7.6 ms | 8.5 ms | 4.9 ms |

During the calculation of the time delay for the User Plane, the processing time delay at the base station, the processing time delay at the UE and the frame alignment time are all related to the TTI length. If the TI length is shortened, the total time delay at the User Plane may be shortened too. On the basis of an existing LTE frame structure, the TTI may be 0.5 ms or smaller, i.e., the TTI length may be equal to the number of symbols contained in one slot in the existing LTE frame structure. For example, the TTI may contain 7 symbols when normal Cyclic Prefix (CP) is used or 6 symbols when extended CP is used. Also, the TII length may be shortened to be smaller than the length of one slot, e.g., the TTI may contain one or several symbols.

In the LTE system, the conventional channel transmission is defined on the unit of TTI=1 ms, i.e., each TTI is just one subframe and has a length of 1 ms. When there is uplink data to be transmitted by the UE, the UE may detect an Uplink grant (UL grant) within the downlink subframes. The UL grant is transmitted using a predetermined Downlink Control Information (DCI) format, and it is used to notify the UE the transmission parameters including resource for the uplink transmission, Modulation and Coding Scheme (MCS) level, redundancy version, Transmission Power Control (TPC) command. In addition, there exists a fixed scheduling timing relationship between the UL grant and a Physical Uplink Shared CHannel (PUSCH) scheduled by the UL grant for carrying the uplink data, i.e., the UL grant transmitted within a subframe n is used for scheduling the transmission of the PUSCH within a subframe n+k, where k is 4 for the FDD system while k depends on different uplink/downlink configurations for the TDD system.

When the TTI length is not 1 ms, the data and the scheduling signaling may not be transmitted on the unit of subframes, and they may support the allocation of the uplink and downlink transmission time periods in a more flexible manner. Lengths of the uplink and downlink transmission time periods within different subframes may change along with a traffic load. Within one uplink transmission time period, the TTI length for the service transmission may also change dynamically in accordance with a transmission requirement. At this time, a fixed scheduling timing does not apply, and currently there is no definite scheme for the data transmission.

Along with the change of the mobile communication service requirement, a higher requirement on the time delay performance at the User Plane has been defined by many organizations for a future mobile communication system. One of the methods for shortening the time delay is to reduce the TTI length. However, after the TTI length has been shorted, there is still no definite scheme for the data transmission.

SUMMARY

An object of the present disclosure is to provide an uplink transmission method and an uplink transmission device, so as to provide a definite data transmission method after the TTI length is shortened, thereby to transmit the data accurately and efficiently.

In one aspect, the present disclosure provides in some embodiments an uplink transmission method, including: detecting an UL grant on a target time-field resource and a target frequency-field resource in a first time unit, the UL grant being to schedule one or more UEs to perform uplink transmission in a target time unit, a time unit having a predefined length of B1 subframes or B2 symbols, where B1 and B2 are each an integer greater than or equal to 1; acquiring scheduling information for the UE in the target time unit from the UL grant; and performing the uplink transmission on a time-domain resource and a frequency-domain resource scheduled in the target time unit in accordance with the scheduling information.

In a possible embodiment of the present disclosure, the step of acquiring the scheduling information for the UE in the target time unit from the UL grant includes: processing appendix information in the UL grant; determining whether the UL grant contains the scheduling information for the UE; and when the UL grant contains the scheduling information for the UE, acquiring the scheduling information for the UE in the target time unit from the UL grant.

In a possible embodiment of the present disclosure, the appendix information in the UL grant is a predetermined information field in the UL grant and the predetermined information field is configured to indicate UE identifier(s) of the one or more UEs scheduled by the UL grant, or the appendix information in the UL grant is scrambling information for the UL grant, or the appendix information in the UL grant is a first predetermined sequence carried before the UL grant and corresponding to the UE identifier. A correspondence between the first predetermined sequence and the UE identifier is pre-defined or pre-configured.

In a possible embodiment of the present disclosure, the target time-field resource is a predetermined symbol position in the first time unit, and the predetermined symbol position contains one or more symbols.

In a possible embodiment of the present disclosure, the predetermined symbol position is an $a^{th}$ symbol or an $a^{th}$ last symbol, where a is an integer greater than or equal to 1; or the predetermined symbol position contains K1 consecutive symbols starting from the $a^{th}$ symbol or the $a^{th}$ last symbol, where a is an integer greater than or equal to 1, and K1 is an integer greater than or equal to 1; and/or when the first time unit contains one downlink transmission resource region, the predetermined symbol position is a first symbol or a last symbol in the downlink transmission resource region, or the predetermined symbol position contains K1 consecutive symbols starting from the first symbol or the last K1 symbols in the downlink transmission resource region, where K1 is an integer greater than or equal to 1; and/or when the first time unit contains a plurality of downlink transmission resource regions, the predetermined symbol position is a first symbol or a last symbol in a first or last downlink transmission resource region, or the predetermined symbol position contains K1 consecutive symbols starting from the first symbol or the last K1 symbols in the first or last downlink transmission resource region, where K1 is an integer greater than or equal to 1. The downlink transmission resource region is a resource region allocated in advance in the first time unit for downlink transmission.

In a possible embodiment of the present disclosure, the target frequency-domain resource is a predetermined subcarrier position or a predetermined resource unit position in frequency domain, the predetermined subcarrier position contains one or more subcarriers, the predetermined resource unit position contains one or more resource units, each resource unit is a resource region including X1 symbols in time domain and X2 consecutive or inconsecutive subcarriers in frequency domain, where X1 and X2 are each an integer greater than or equal to 1.

In a possible embodiment of the present disclosure, the target frequency-domain resources are consecutive in frequency domain, or the target frequency-domain resources are evenly distributed in frequency domain within a system bandwidth or a bandwidth corresponding to the downlink transmission in accordance with a predetermined granularity, or the target frequency-domain resources are at a highest-frequency position, a lowest-frequency position or a mediate-frequency position within the system bandwidth or the bandwidth corresponding to the downlink transmission.

In a possible embodiment of the present disclosure, the target time-domain resources and the target frequency-domain resources are pre-defined or configured through signaling.

In a possible embodiment of the present disclosure, the target time unit is pre-defined or configured through signaling. The target time unit is one of the following unit: the first time unit, a time unit immediately following the first time unit, a $k^{th}$ time unit following the first time unit, an earliest time unit containing an uplink transmission resource and meeting a processing time delay for the UL grant starting from or immediately following the first time unit, where k is an integer greater than 1.

In a possible embodiment of the present disclosure, the uplink transmission method further includes carrying a second predetermined sequence when performing the uplink transmission on the time-domain resource and the frequency-domain resource scheduled in the target time unit, so that the other UE(s) and/or base station(s) is capable of performing interference measurement on the UE in accordance with the second predetermined sequence. The second predetermined sequence is related to the UE identifier.

In another aspect, the present disclosure provides in some embodiments an uplink transmission method, including steps of: creating one or more UL grants, each UL grant being to schedule one or more UEs to perform uplink transmission in a target time unit; and transmitting the UL grants on a target time-domain resource and a target frequency-domain resource in a first time unit, the time unit having a predefined length of B1 subframes or B2 symbols, where B1 and B2 are each an integer greater than or equal to 1.

In a possible embodiment of the present disclosure, the uplink transmission method further includes setting appendix information in each UL grant, and the appendix information is to indicate whether or not the UL grant contains scheduling information for the UE. The appendix information is a predetermined information field in the UL grant and the predetermined information field contains UE identifier (s) of the one or more UEs scheduled by the UL grant, or the appendix information is scrambling information for the UL grant, or the appendix information is a first predetermined sequence carried before the UL grant and corresponding to each UE identifier. A correspondence between the first predetermined sequence and the UE identifier is pre-defined or pre-configured.

In a possible embodiment of the present disclosure, the target time-domain resource is a predetermined symbol position in the first time unit, and the predetermined symbol position contains one or more symbols.

In a possible embodiment of the present disclosure, the predetermined symbol position is an $a^{th}$ symbol or an $a^{th}$ last symbol, where a is an integer greater than or equal to 1; or the predetermined symbol position contains K1 consecutive symbols starting from the $a^{th}$ symbol or the $a^{th}$ last symbol, where a is an integer greater than or equal to 1, and K1 is an integer greater than or equal to 1; and/or when the first time unit contains one downlink transmission resource region, the predetermined symbol position is a first symbol or a last symbol in the downlink transmission resource region, or the predetermined symbol position contains K1 consecutive symbols starting from the first symbol or the last K1 symbols in the downlink transmission resource region, where K1 is an integer greater than or equal to 1; and/or when the first time unit contains a plurality of downlink transmission resource regions, the predetermined symbol position is a first symbol or a last symbol in a first or last downlink transmission resource region, or the predetermined symbol position contains K1 consecutive symbols starting from the first symbol or the last K1 symbols in the first or last downlink transmission resource region, where K1 is an integer greater than or equal to 1. The downlink transmission resource region is a resource region allocated in advance in the first time unit for downlink transmission.

In a possible embodiment of the present disclosure, the target frequency-domain resource is a predetermined subcarrier position or a predetermined resource unit position in frequency domain, the predetermined subcarrier position contains one or more subcarriers, the predetermined resource unit position contains one or more resource units, each resource unit is a resource region comprising X1 symbols in time domain and X2 consecutive or inconsecutive subcarriers in frequency domain, where X1 and X2 are each an integer greater than or equal to 1.

In a possible embodiment of the present disclosure, the target frequency-domain resources are consecutive in frequency domain, or the target frequency-domain resources are evenly distributed in frequency domain within a system bandwidth or a bandwidth corresponding to the downlink transmission in accordance with a predetermined granularity, or the target frequency-domain resources are at a highest-frequency position, a lowest-frequency position or a mediate-frequency position within the system bandwidth or the bandwidth corresponding to the downlink transmission.

In a possible embodiment of the present disclosure, the target time-domain resources and the target frequency-domain resources are pre-defined or configured through signaling.

In a possible embodiment of the present disclosure, the target time unit is pre-defined or configured through signaling, and the target time unit is one of the following time unit: the first time unit, a time unit immediately following the first time unit, a $k^{th}$ time unit following the first time unit, a earliest time unit containing an uplink transmission resource and meeting a processing time delay for the UL grant starting from or immediately following the first time unit, where k is an integer greater than 1.

In yet another aspect, the present disclosure provides in some embodiments an uplink transmission device, including: a detection module configured to detect an UL grant on a target time-domain resource and a target frequency-domain resource in a first time unit, the UL grant being to schedule one or more UEs to perform uplink transmission in a target time unit, a time unit having a predefined length of B1 subframes or B2 symbols, where B1 and B2 are each an integer greater than or equal to 1; an acquisition module configured to acquire scheduling information for the UE in the target time unit from the UL grant; and an uploading module configured to perform the uplink transmission on a time-domain resource and a frequency-domain resource scheduled in the target time unit in accordance with the scheduling information.

In a possible embodiment of the present disclosure, the acquisition module includes: a first acquisition sub-module configured to process appendix information in the UL grant, and determining whether the UL grant contains the scheduling information for the UE; and a second acquisition sub-module configured to, when the UL grant contains the scheduling information for the UE, acquire the scheduling information for the UE in the target time unit from the UL grant.

In a possible embodiment of the present disclosure, the appendix information in the UL grant is a predetermined information field in the UL grant and the predetermined information field is configured to indicate UE identifier(s) of the one or more UEs scheduled by the UL grant, or the appendix information in the UL grant is scrambling information for the UL grant, or the appendix information in the UL grant is a first predetermined sequence carried before the UL grant and corresponding to the UE identifier. A correspondence between the first predetermined sequence and the UE identifier is pre-defined or pre-configured.

In a possible embodiment of the present disclosure, the target time-domain resource is a predetermined symbol position in the first time unit, and the predetermined symbol position contains one or more symbols.

In a possible embodiment of the present disclosure, the predetermined symbol position is an $a^{th}$ symbol or an at last symbol, where a is an integer greater than or equal to 1; or the predetermined symbol position contains K1 consecutive symbols starting from the $a^{th}$ symbol or the as last symbol, where a is an integer greater than or equal to 1, and K1 is an integer greater than or equal to 1; and/or when the first time unit contains one downlink transmission resource region, the predetermined symbol position is a first symbol or a last symbol in the downlink transmission resource region, or the predetermined symbol position contains K1 consecutive symbols starting from the first symbol or the last K1 symbols in the downlink transmission resource region, where K1 is an integer greater than or equal to 1; and/or when the first time unit contains a plurality of downlink transmission resource regions, the predetermined symbol position is a first symbol or a last symbol in a first or last downlink transmission resource region, or the predetermined symbol position contains K1 consecutive symbols starting from the first symbol or the last K1 symbols in the first or last downlink transmission resource region, where K1 is an integer greater than or equal to 1. The downlink transmission resource region is a resource region allocated in advance in the first time unit for downlink transmission.

In a possible embodiment of the present disclosure, the target frequency-domain resource is a predetermined subcarrier position or a predetermined resource unit position in frequency domain, the predetermined subcarrier position contains one or more subcarriers, the predetermined resource unit position contains one or more resource units, each resource unit is a resource region including X1 symbols in time domain and X2 consecutive or inconsecutive subcarriers in frequency domain, where X1 and X2 are each an integer greater than or equal to 1.

In a possible embodiment of the present disclosure, the target frequency-domain resources are consecutive in frequency domain, or the target frequency-domain resources are evenly distributed in frequency domain within a system bandwidth or a bandwidth corresponding to the downlink transmission in accordance with a predetermined granularity, or the target frequency-domain resources are at a highest-frequency position, a lowest-frequency position or a mediate-frequency position within the system bandwidth or the bandwidth corresponding to the downlink transmission.

In a possible embodiment of the present disclosure, the target time-domain resources and the target frequency-domain resources are pre-defined or configured through signaling.

In a possible embodiment of the present disclosure, the target time unit is pre-defined or configured through signaling. The target time unit is one of the following time unit: the first time unit, a time unit immediately following the first time unit, a $k^{th}$ time unit following the first time unit, an earliest time unit containing an uplink transmission resource and meeting a processing time delay for the UL grant starting from or immediately following the first time unit, where k is an integer greater than 1.

In a possible embodiment of the present disclosure, the uplink transmission device further includes an interference measurement module configured to carry a second predetermined sequence when performing the uplink transmission on the time-domain resource and the frequency-domain resource scheduled in the target time unit, the other UE(s) and/or base station(s) is capable of performing interference measurement on the UE in accordance with the second predetermined sequence. The second predetermined sequence is related to the UE identifier.

In still yet another aspect, the present disclosure provides in some embodiments an uplink transmission device, including a processor, and a memory connected to the processor via a bus interface and configured to store therein programs and data for the operation of the processor. The processor is configured to call and execute the programs and data stored in the memory, so as to achieve functions of: a detection module configured to detect an UL grant on a target time-domain resource and a target frequency-domain resource in a first time unit, the UL grant being to schedule one or more UEs to perform uplink transmission in a target time unit, a time unit having a predefined length of B1 subframes or B2 symbols, where B1 and B2 are each an integer greater than or equal to 1; an acquisition module configured to acquire scheduling information for the UE in the target time unit from the UL grant; and an uploading module configured to perform the uplink transmission on a time-domain resource and a frequency-domain resource scheduled in the target time unit in accordance with the scheduling information.

In still yet another aspect, the present disclosure provides in some embodiments an uplink transmission device, including: a creation module configured to create one or more UL grants, each UL grant being to schedule one or more UEs to perform uplink transmission in a target time unit; and an UL grant transmission module configured to transmit the UL grants on a target time-domain resource and a target frequency-domain resource in a first time unit, the time unit having a predefined length of B1 subframes or B2 symbols, where B1 and B2 are each an integer greater than or equal to 1.

In a possible embodiment of the present disclosure, the uplink transmission device further includes a configuration module configured to set appendix information in each UL grant, and the appendix information is to indicate whether or not the UL grant contains scheduling information for the UE. The appendix information is a predetermined information field in the UL grant and the predetermined information field contains a UE identifier or UE identifiers of the one or more UEs scheduled by the UL grant, or the appendix information is scrambling information for the UL grant, or the appendix information is a first predetermined sequence carried before the UL grant and corresponding to each UE identifier. A correspondence between the first predetermined sequence and the UE identifier is pre-defined or pre-configured.

In a possible embodiment of the present disclosure, the target time-domain resource is a predetermined symbol position in the first time unit, and the predetermined symbol position contains one or more symbols.

In a possible embodiment of the present disclosure, the predetermined symbol position is an $a^{th}$ symbol or an $a^{th}$ last symbol, where a is an integer greater than or equal to 1; or the predetermined symbol position contains K1 consecutive symbols starting from the $a^{th}$ symbol or the $a^{th}$ last symbol, where a is an integer greater than or equal to 1, and K1 is an integer greater than or equal to 1; and/or when the first time unit contains one downlink transmission resource region, the predetermined symbol position is a first symbol or a last symbol in the downlink transmission resource region, or the predetermined symbol position contains K1 consecutive symbols starting from the first symbol or the last K1 symbols in the downlink transmission resource region, where K1 is an integer greater than or equal to 1; and/or when the first time unit contains a plurality of downlink transmission resource regions, the predetermined symbol position is a first symbol or a last symbol in a first or last downlink transmission resource region, or the predetermined symbol position contains K1 consecutive symbols starting from the first symbol or the last K1 symbols in the first or last downlink transmission resource region, where K1 is an integer greater than or equal to 1. The downlink transmission resource region is a resource region allocated in advance in the first time unit for downlink transmission.

In a possible embodiment of the present disclosure, the target frequency-domain resource is a predetermined subcarrier position or a predetermined resource unit position in frequency domain, the predetermined subcarrier position contains one or more subcarriers, the predetermined resource unit position contains one or more resource units, each resource unit is a resource region comprising X1 symbols in time domain and X2 consecutive or inconsecutive subcarriers in frequency domain, where X1 and X2 are each an integer greater than or equal to 1.

In a possible embodiment of the present disclosure, the target frequency-domain resources are consecutive in frequency domain, or the target frequency-domain resources are evenly distributed in frequency domain within a system bandwidth or a bandwidth corresponding to the downlink transmission in accordance with a predetermined granularity, or the target frequency-domain resources are at a highest-frequency position, a lowest-frequency position or a mediate-frequency position within the system bandwidth or the bandwidth corresponding to the downlink transmission.

In a possible embodiment of the present disclosure, the target time-domain resources and the target frequency-domain resources are pre-defined or configured through signaling.

In a possible embodiment of the present disclosure, the target time unit is pre-defined or configured through signaling, and the target time unit is one of the following time unit: the first time unit, a time unit immediately following the first time unit, a $k^{th}$ time unit following the first time unit, a earliest time unit containing an uplink transmission resource and meeting a processing time delay for the UL grant starting from or immediately following the first time unit, where k is an integer greater than 1.

In still yet another aspect, the present disclosure provides in some embodiments an uplink transmission device, including a processor, and a memory connected to the processor via a bus interface and configured to store therein programs and data for the operation of the processor. The processor is configured to call and execute the programs and data stored in the memory, so as to achieve functions of: a creation module configured to create one or more UL grants, each UL grant being to schedule one or more UEs to perform uplink transmission in a target time unit; and an UL grant transmission module configured to transmit the UL grants on a target time-domain resource and a target frequency-domain resource in a first time unit, the time unit having a predefined length of B1 subframes or B2 symbols, where B1 and B2 are each an integer greater than or equal to 1.

According to the uplink transmission method and device in the embodiments of the present disclosure, the base station transmits the UL grant on a specific time-frequency domain in the first time unit. The target UE which needs to perform the uplink transmission detects the UL grant on the specific time-frequency domain, and performs the uplink transmission on the time-domain resource and the frequency-domain resource scheduled in the target time unit in accordance with the scheduling information contained in the UL grant for the UE in the target time unit. As a result, it is able to schedule the UEs by a network side in a coordinated manner, thereby to reduce the times of blind detection on uplink scheduling signaling by the UE, and improve the transmission efficiency.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

First Embodiment

Figure 1:
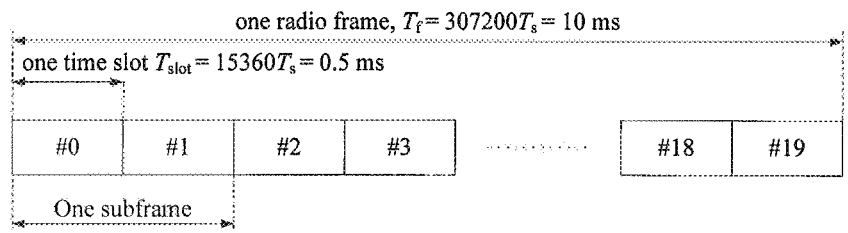
FIG. 1 is a schematic view showing a frame structure type 1 adopted by a conventional FDD system.
Figure 2:
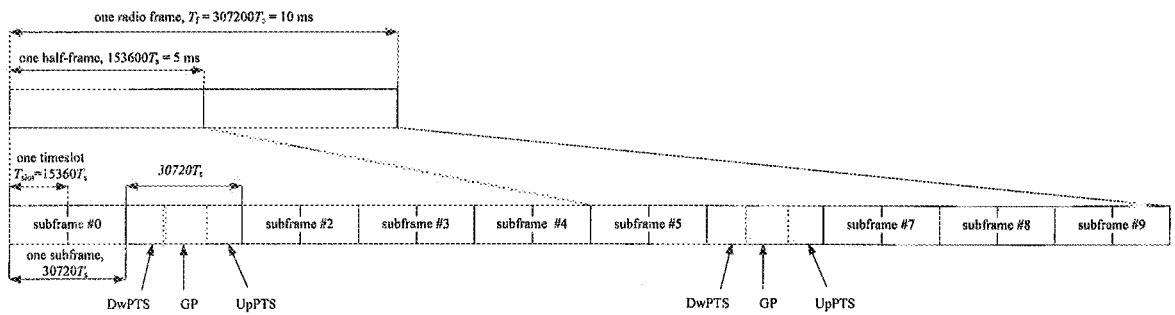
FIG. 2 is a schematic view showing a frame structure type 2 adopted by a conventional TDD system.
Figure 3:
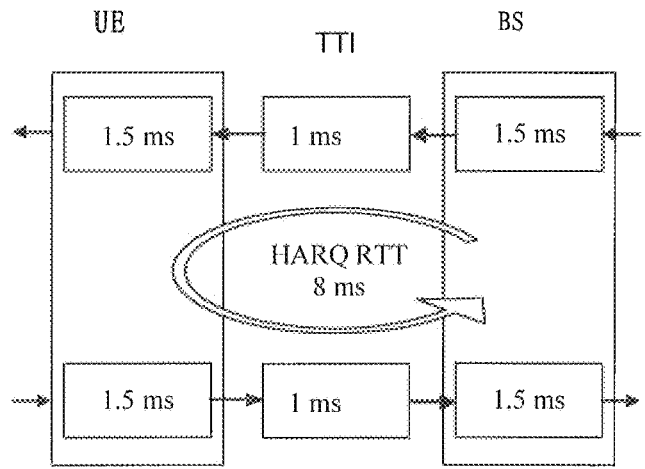
FIG. 3 is a schematic view showing a time delay at a User Plane of the conventional FDD system for downlink transmission.
Figure 4:
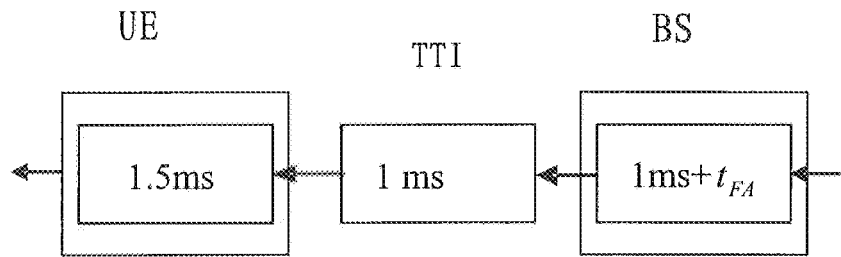
FIG. 4 is a schematic view showing a time delay at the User Plane of the conventional TDD system for the downlink transmission.
Figure 5:
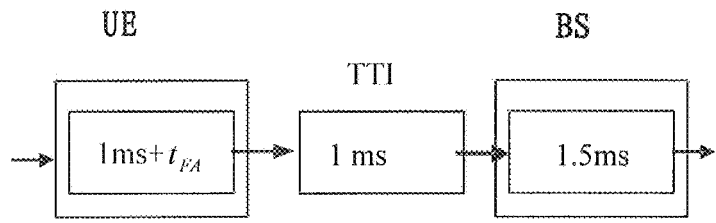
FIG. 5 is a schematic view showing a time delay at the User Plane of the conventional TDD system for uplink transmission.
Figure 6:
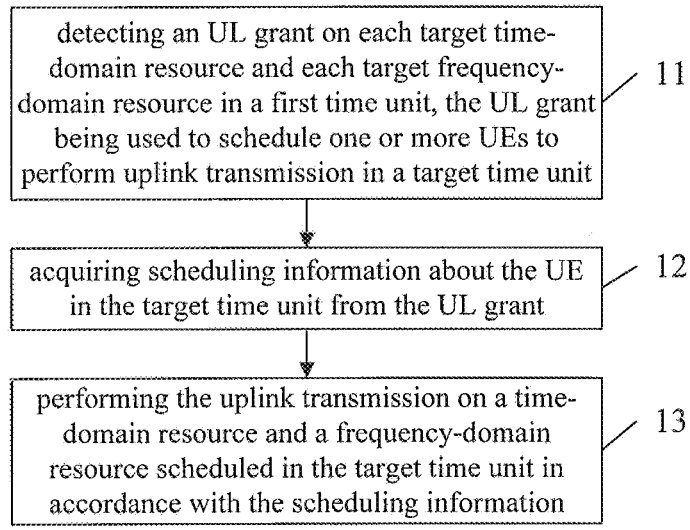
FIG. 6 is a flow chart of an uplink transmission method according to a first embodiment of the present disclosure.

As shown in FIG. 6, the present disclosure provides in this embodiment an uplink transmission method for use in a target UE, which includes: Step 11 of detecting an UL grant on each target time-domain resource and each target frequency-domain resource in a first time unit, the UL grant being used to schedule one or more UEs to perform uplink transmission in a target time unit, the time unit having a predefined length of B1 subframes or B2 symbols, where B1 and B2 are each an integer greater than or equal to 1; Step 12 of acquiring scheduling information for the UBE in the target time unit from the UL grant; and Step 13 of performing the uplink transmission on a time-domain resource and a frequency-domain resource scheduled in the target time unit in accordance with the scheduling information.

In the first embodiment of the present disclosure, the time units (including the first time unit and the target time unit) may each have a predetermined length of B1 subframes or B2 symbols. Each of the target time unit and the first time unit is a defined time unit. The target time unit is not temporally earlier than the first time unit.

In the first embodiment of the present disclosure, the target time unit is pre-defined or configured through signaling. To be specific, the target time unit is one of the first time unit, a time unit immediately following the first time unit, a $k^{th}$ time unit following the first time unit, a time unit including an uplink transmission resource and firstly meeting a processing time delay for the UL grant starting from or immediately following the first time unit, where k is an integer greater than 1.

In one scenario, the target time unit may be the first time unit in which the UL grant is transmitted. For example, when a time-field resource for the transmission of the UL grant is in an earlier position in the first time unit while a scheduled uplink transmission resource region is in a later position in the first time unit, taking one subframe as one time unit as an example, the UL grant is transmitted on a first symbol within a subframe n, and the uplink transmission resource region includes the last three symbols within the subframe n, i.e., $12^{th}$, $13^{th}$ and $14^{th}$ symbols, after the detection of the UL grant on the first symbol, the UE may have enough time to process the UL grant, so as to acquire the scheduling information on the last three symbols. Then, the UE may perform the uplink transmission on the time-domain and frequency-domain resources scheduled on the last three symbols in accordance with the scheduling information. In another scenario, the target time unit may also be the time unit immediately following the first time unit (presumed that there is the uplink transmission in this time unit) or the k time unit following the first time unit (presumed that there is the uplink transmission in this time unit), where k is an integer greater than or equal to 1. For example, when there is no sufficient symbol interval between the time-domain resource for the transmission of the UL grant and the scheduled uplink transmission resource region in the same time unit n, it means there is no enough processing time for the UE. Taking one subframe as one time unit as an example, the UL grant is transmitted on a first symbol within the subframe n and the uplink transmission resource region includes the symbols starting from a $3^{rd}$ symbol within the subframe n, after the detection of the UL grant on the first symbol, the UE may have no enough time to process the UL grant, i.e., it is impossible for the UE to acquire the scheduling information on the $3^{rd}$ symbol. At this time, the UL grant may schedule the UE to perform the uplink transmission at an uplink transmission resource region within a subframe n+1 or a subframe after the subframe n+1. In order to be adapted to different uplink/downlink resource allocation, conservatively, it may be predefined that the target time unit is a time unit immediately following a time unit n (implicitly, it is necessary to ensure that there must be the uplink transmission resource in this time unit), or the target time unit is configured through signaling in a semi-static manner in accordance with the UL/DL resource configurations. In addition, the target time unit may also be a time unit containing an uplink transmission resource and meeting a processing time delay for the UL grant starting from or immediately following the first time unit, i.e., the target time unit is not constant but determined dynamically in accordance with an actual situation. For example, when the uplink transmission resource contained in the current time unit n is capable of being scheduled, the target time unit is just the current time unit n, otherwise an earliest time unit after the time unit n that meets the processing time delay and contains the uplink transmission resource could be founded as the target time unit. Considering that the uplink transmission resource and the downlink transmission resource are allocated dynamically in each time unit, and a certain time unit may probably not contain any uplink transmission resource, it is necessary to move to the subsequent time units, so as to find out a time unit that meets the processing time delay and contains the uplink transmission resource.

To be specific, the UE in the first embodiment is a UE which needs to perform the uplink transmission. In Step 11, a plurality of target UEs may detect the UL grant simultaneously, and process the detected UL grant, so as to acquire the respective scheduling information. It should be noticed that, the scheduling information for one or more UEs may be carried in one UL grant, so the scheduling information for different UEs may be indicated by UE identifiers (UE IDs). Usually, when a plurality of UEs is capable of being scheduling by one UL grant, these UEs may perform the uplink transmission on a same time-domain resource and a same frequency-domain resource, and information transmitted by the UEs may be differentiated from each other by the orthogonality of spatial channels, i.e., a Multi-User Multiple-Input Multiple-Output (MU-MIMO) mode. The scheduling information is used to indicate sizes and positions of the time-domain and frequency-domain resources for the uplink transmission performed by the target UE in the target time unit. For example, the scheduling information may be used to indicate the number of symbols on a time domain and a size of a bandwidth on a frequency domain for the uplink transmission (e.g., the number of Single Carriers (SCs) or Resource Units (RUs), where RU is defined as a resource region including X1 symbols on the time domain and X2 subcarriers on the frequency domain, the X2 subcarriers are consecutive or inconsecutive on the frequency domain, and each of X1 and X2 is an integer greater than or equal to 1). In addition, the scheduling information may further include modulation and coding information, and power control information.

Upon the acquisition of the scheduling information through processing the detected UL grant, each UE may transmit uplink information on a resource corresponding to the scheduling information.

Further, the base station may schedule a plurality of UEs to perform the uplink transmission on different resources in a same target time unit, so a plurality of UL grants may be transmitted by the base station in the first time unit. At this time, the UL grant detected by the UE may include or not include the scheduling information for the target UE. Hence, Step 12 may include: Step 121 of processing appendix information in the UL grant, so as to determine whether the UL grant contains the scheduling information for the UE; and Step 122 of, if the UL grant contains the scheduling information for the UE, acquiring the scheduling information for the UE in the target time unit from the UL grant.

To be specific, the appendix information in the UL grant may be a predetermined information field in the UL grant which indicates a UE identifier of the UE scheduled by the UL grant. When a plurality of UEs is capable of being scheduling by the UL grant, the predetermined information field may be used to indicate UE identifiers of the plurality of UEs. At this time, when one UL grant has been detected, the UE needs to further process the predetermined information field, so as to read the UE identifiers. If the UE identifier corresponding to the UE itself has been read, it means that the UL grant contains the scheduling information for the UE, and at this time the UE may further read the scheduling information. Otherwise, it means that the UL grant does not contain any scheduling information for the UE, and the UE may continue to detect a next UL grant and determine whether or not the next UL grant contains the scheduling information for the UE itself as mentioned above. If the UL grant is capable of being used to schedule a set of UEs, the predetermined information field may contain identification information for the set of UEs.

The appendix information may also be scrambling information for the UL grant. When one UL grant has been detected by the UE, the UE needs to further process the scrambling information. For example, a scrambling sequence corresponding to the UE identifier may be used to perform a descrambling operation. If that the scrambling information is descrambled correctly, it means that the UL grant contains the scheduling information for the UE itself, and the UE may read the scheduling information. Otherwise, it means that the UL grant does not contain the scheduling information for the UE itself, and the UE may continue to detect a next UL grant and determine whether or not the next UL grant contains the scheduling information as mentioned above. If the UL grant is capable of being used to schedule a set of UEs, the scrambling sequence may be a sequence corresponding to the set of UEs, and the relationship may be pre-defined or pre-configured.

The appendix information may also be a first predetermined sequence carried before the UL grant and corresponding to each UE identifier, and a relationship may be pre-defined or pre-configured. Different first predetermined sequences are orthogonal to each other. Prior to the detection of the UL grant, the UE may firstly detect the first predetermined sequences. If the first predetermined sequence corresponding to the UE itself has been detected, the UE may further detect and process the UL grant following the first predetermined sequence. At this time, it may be directly deemed that the UL grant contains the scheduling information for the UE itself. In a possible embodiment of the present disclosure, whether or not the UL grant contains the scheduling information for the UE itself may be determined through reading the predetermined information field (such as the appendix information) or determining the scrambling sequence as mentioned above. If the first determined sequence has not been detected, the detection of the UL grant may not be performed in a current search portion. When there is a plurality of search portions, the UE may continue to perform the above-mentioned detection for a next search portion. At this time, the appendix information is used to indicate the groups of the target UEs, and help each target UE to determine whether or not a current UL grant contains the scheduling information for the target UE itself. In this case, each target UE needs to know in advance which group it is belong to, so as to determine whether or not the scheduling information for the group in which the target UE is belong to is contained in the detected UL grant, thereby to reduce the times of blind detection operations made by the UE on the UL grants and improve the detection efficiency. It should be noticed that, the mode of grouping the target UEs in accordance with a certain rule is merely for illustrative purposes, but shall not be used to limit the scope of the present disclosure, i.e., any other indication information may also be applied to the present disclosure.

For ease of understanding, each target time-domain resource may be a predetermined symbol position in the first time unit, and the predetermined symbol position may contain one or more symbols.

To be specific, the predetermined symbol position may be an $a^{th}$ symbol or an $a^{th}$ last symbol, where a is an integer greater than or equal to 1; or the predetermined symbol position may contain K1 consecutive symbols starting from the a"symbol or the a" last symbol, where a is an integer greater than or equal to 1, and K1 is an integer greater than or equal to 1.

When the first time unit contains one downlink transmission resource region, the predetermined symbol position may be a first symbol or a last symbol in the downlink transmission resource region; or the predetermined symbol position may contain K1 consecutive symbols starting from the first symbol or the last K1 symbols in the downlink transmission resource region, where K1 is an integer greater than or equal to 1.

When the first time unit contains a plurality of downlink transmission resource regions, the predetermined symbol may is a first symbol or a last symbol in a first or last downlink transmission resource region, or the predetermined symbol position contains K1 consecutive symbols starting from the first symbol or the last K1 symbols in the first or last downlink transmission resource region, where K1 is an integer greater than or equal to 1.

The downlink transmission resource region is a resource region allocated in advance in the first time unit for the downlink transmission. One time unit may include one or more downlink transmission resource regions. Each region may include P consecutive symbols on the time domain, and all or a part of the system bandwidth on the frequency domain. The plurality of downlink transmission resource regions may be inconsecutive. The allocation of the downlink transmission resource regions may be notified to the UEs in advance, and the downlink transmission resource regions may be allocated in a same way or different ways in different time units.

In a word, the target time-domain resource may include the $a^{th}$ or $a^{th}$ last symbol in the time unit n, where a is an integer greater than or equal to 1; or the target time-domain resource may include K1 consecutive symbols starting from the $a^{th}$ or the $a^{th}$ last symbol in the time unit n, where a is an integer greater than or equal to 1, and K1 is an integer greater than or equal to 1. When the time unit n includes a plurality of downlink transmission resource regions, the target time-domain resource may include a first or last symbol at a first or last downlink transmission resource region in the time unit n, or K1 consecutive symbols starting from the first symbol or the last K1 symbols at the first or last downlink transmission resource region in the time unit n, where K1 is an integer greater than or equal to 1. When the time unit n merely includes one downlink transmission resource region, the target time-domain resource may include a first or last symbol at the downlink transmission resource region in the time unit n, or K1 consecutive symbols starting from the first symbol or the last K1 symbols at the downlink transmission resource region, where K1 is an integer greater than or equal to 1.

In one scenario, each target frequency-domain resource may be a predetermined subcarrier position or a predetermined resource unit position in frequency domain. The predetermined subcarrier position may contain one or more subcarriers, and the predetermined resource unit position may contain one or more resource units. Each resource unit may be a resource region including X1 symbols in time domain and X2 consecutive or inconsecutive subcarriers in frequency domain, where X1 and X2 are each an integer greater than or equal to 1.

In a possible embodiment of the present disclosure, the target frequency-domain resources may be consecutive in frequency domain, or the target frequency-domain resources may be evenly distributed in frequency domain within a system bandwidth or a bandwidth corresponding to the downlink transmission in accordance with a predetermined granularity, or the target frequency-domain resources may be at a highest-frequency position, a lowest-frequency position or a mediate-frequency position within the system bandwidth or the bandwidth corresponding to the downlink transmission.

Further, each of the target time-domain resource and the target frequency-domain resource may include one or more pre-defined resources, or one resource notified through signaling (e.g., high-layer signaling or broadcast information) and selected from a plurality of predefined resources. When each of the target time-domain resource and the target frequency-domain resource includes more than one resources, the UE needs to detect the UL grant on these resources, and determine whether or not the UE grant is to be used for the UE in accordance with a specific information domain in the UL grant, a scrambling mode of the UL grant or a specific sequence transmitted prior to the UL grant. The base station itself may select one resource to transmit the UL grant for one UE or a set of UEs, and select another resource to transmit the UL grant for another UE or another set of UEs. Here, a position where the UL grant is transmitted by the base station will not be particularly defined. When there are relatively a large amount of resources for the transmission of the UL grants, in order to reduce the number of the blind detection operations made by the UEs and time for the blind detection operations, one or several target time-domain resources and one or several target frequency-domain resources may be pre-configured for, or notified to, each target UE. At this time, the target UE may directly detect the UL grants on the target time-domain resource(s) and the target frequency-domain resource(s). To be specific, the network side may notify the target time-domain resource(s) and the target frequency-domain resource(s) to each target UE through the high-layer signaling or the broadcast information, which will not be particularly defined herein.

In the first embodiment of the present disclosure, the uplink transmission method may further include carrying a second predetermined sequence when performing the uplink transmission on the time-domain resource and the frequency-domain resource scheduled in the target time unit, so that the other UE and/or the base station is capable of performing interference measurement on the UE in accordance with the second predetermined sequence. The second predetermined sequence is related to the UE identifier.

To be specific, the uplink information may include uplink service data and/or uplink control information. A specific sequence (the second predetermined sequence) related to the UE ID may be carried in the uplink information. The other UEs and/or the base station may identify the UE and perform the interference measurement on the UE in accordance with the specific sequence. The other UEs may include UEs in a current cell and/or a neighboring cell. The second predetermined sequence may be generated on the basis of a Zadoff-Chu (ZC) sequence, an m sequence or a Constant Amplitude Zero Autocorrelation (CAZAC) sequence. Of course, the second predetermined sequence may also be generated on the basis of any other sequence having high autocorrelation and low cross-correlation, as long as the generated sequence is related to the UE ID.

According to the uplink transmission method at a target UE side in the first embodiment of the present disclosure, the UL grant is detected on the specific time-domain and frequency-domain resources in a time unit, and the UL grant is used to schedule the uplink transmission at the uplink transmission resource region in the specific time unit. As a result, it is able for the network side to schedule the UE in a coordinated manner, and reduce the number of the blind detection operations made by the UE on the uplink scheduling signaling, thereby to improve the transmission efficiency.

Second Embodiment

Figure 7:
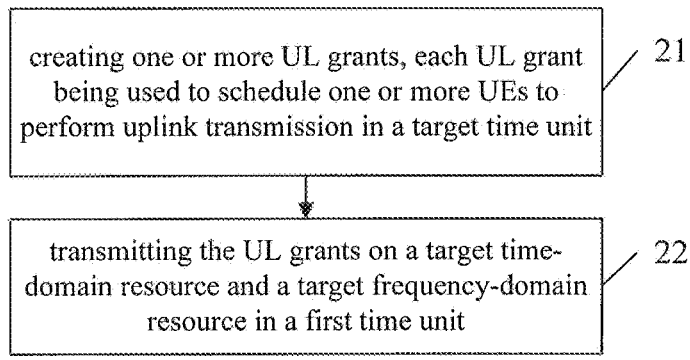
FIG. 7 is a flow chart of another uplink transmission method according to a second embodiment of the present disclosure.

As shown in FIG. 7, the present disclosure further provides in the second embodiment an uplink transmission method at a base station side, which includes: Step 21 of configuring one or more UL grants, each UL grant being used to schedule one or more UEs to perform uplink transmission in a target time unit; and Step 22 of transmitting the UL grants on a target time-domain resource and a target frequency-domain resource in a first time unit, the time unit having a predefined length of B1 subframes or B2 symbols, where B1 and B2 are each an integer greater than or equal to 1.

To be specific, in the second embodiment of the present disclosure, the base station side may generate one or more UL grants in accordance with the requirement of each UE. If the scheduling information for a plurality of UEs to be scheduled in a target interval is capable of being carried by one UL grant, merely one UL grant may be generated. If the scheduling information for the plurality of UEs to be scheduled in the target interval is incapable of being carried by one UL grant, the target UEs may be divided into a plurality of groups, and one UL grant may be generated with respect to each group.

Further, the uplink transmission method may include Step 23 of setting appendix information in each UL grant, and the appendix information is to indicate whether or not the UL grant contains scheduling information for the UE. The appendix information is a predetermined information field in the UL grant and configured to indicate a UE identifier or UE identifiers of the one or more UEs scheduled by the UL grant, or the appendix information is scrambling information for the UL grant, or the appendix information is a first predetermined sequence carried before the UL grant and corresponding to each UE identifier. A correspondence between the first predetermined sequence and the UE identifier is pre-defined or pre-configured.

When there is a plurality of UL grants, the accessory information may be added before each UL grant, and configured to indicate the groups of the UEs, and help each UE to determine whether or not a current UL grant contains the scheduling information for the UE itself. In addition, the accessory information may also be configured to scramble each UL grant using a scrambling sequence corresponding to each group.

To be specific, each target time-domain resource may be a predetermined symbol position in the first time unit, and the predetermined symbol position may contains one or more symbols.

To be specific, the predetermined symbol position may include an $a^{th}$ symbol or an $a^{th}$ last symbol, where a is an integer greater than or equal to 1; or the predetermined symbol position contains K1 consecutive symbols starting from the $a^{th}$ symbol or the $a^{th}$ last symbol, where a is an integer greater than or equal to 1, and K1 is an integer greater than or equal to 1.

When the first time unit contains one downlink transmission resource region, the predetermined symbol position is a first symbol or a last symbol in the downlink transmission resource region, or the predetermined symbol position contains K1 consecutive symbols starting from the first symbol or the last K1 symbols in the downlink transmission resource region, where K1 is an integer greater than or equal to 1.

When the first time unit contains a plurality of downlink transmission resource regions, the predetermined symbol position is a first symbol or a last symbol in a first or last downlink transmission resource region, or the predetermined symbol position contains K1 consecutive symbols starting from the first symbol or the last K1 symbols in the first or last downlink transmission resource region, where K1 is an integer greater than or equal to 1. The downlink transmission resource region may be a resource region allocated in advance in the first time unit for downlink transmission.

Each target frequency-domain resource may be a predetermined subcarrier position or a predetermined resource unit position in frequency domain, the predetermined subcarrier position contains one or more subcarriers, the predetermined resource unit position contains one or more resource units, each resource unit is a resource region comprising X1 symbols in time domain and X2 consecutive or inconsecutive subcarriers in frequency domain, where X1 and X2 are each an integer greater than or equal to 1.

To be specific, the target frequency-domain resources are consecutive in frequency domain, or the target frequency-domain resources are evenly distributed in frequency domain within a system bandwidth or a bandwidth corresponding to the downlink transmission in accordance with a predetermined granularity, or the target frequency-domain resources are at a highest-frequency position, a lowest-frequency position or a mediate-frequency position within the system bandwidth or the bandwidth corresponding to the downlink transmission.

The target time-domain resources and the target frequency-domain resources may be pre-defined or configured through signaling.

It should be appreciated that, the definitions of the target time-domain resource and the target frequency-domain resource in the second embodiment are same as those in the first embodiment, and thus will not be particularly defined herein.

To be specific, the target time unit may be pro-defined or configured through signaling. The target time unit may include one of the first time unit, a time unit immediately following the first time unit, a $k^{th}$ time unit following the first time unit, a time unit including an uplink transmission resource and meeting a processing time delay for the UL grant starting from or immediately following the first time unit, where k is an integer greater than 1.

The definition of the target time unit is also same as that mentioned in the first embodiment, and thus will not be particularly defined herein.

According to the uplink transmission method at the base station side in the second embodiment of the present disclosure, the UL grant is transmitted on the specific time-domain and frequency-domain resources in an interval, and the UL grant is used to schedule the uplink transmission in an uplink transmission time period within the target interval or at least one interval starting from a $K^{th}$ interval following the target interval, where K is an integer greater than or equal to 1. As a result, it is able for the network side to schedule the UE in a coordinated manner, and reduce the number of the blind detection operations made by the UE on the uplink scheduling signaling, thereby to improve the transmission efficiency.

The uplink transmission method will be described hereinafter through some examples.

First Example

Figure 8:
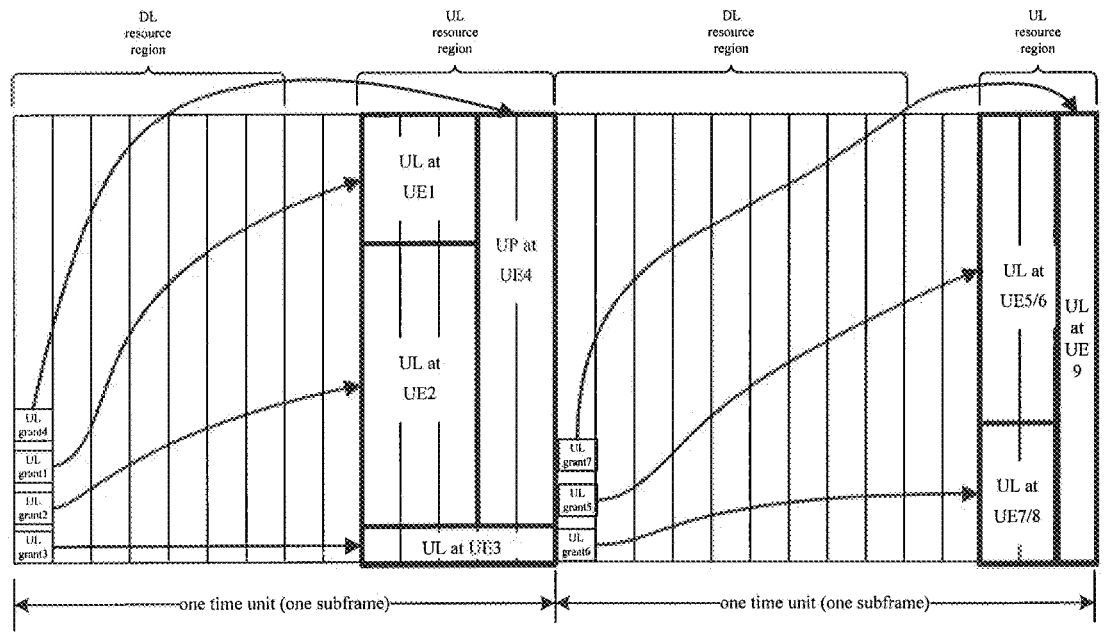
FIG. 8 is a schematic view showing a principle of a first example of the uplink transmission method according to one embodiment of the present disclosure.

Taking one time unit having a length of 1 ms (i.e., one LTE subframe) as an example, the UL granted transmitted in one time unit is used to schedule the uplink transmission within the uplink transmission time period in the time unit. The UL grant is pre-defined or preconfigured to be transmitted at a specific frequency-domain position (e.g., K2 SCs, REs or RUs on a mediate, low-frequency or high-frequency domain, or K2 SCs, REs or RUs dispersed within the downlink transmission bandwidth) on a first symbol in the time unit. As shown in FIG. 8, the base station may transmit the UL grant at a specific frequency-domain position on a first symbol in a time unit. Each target UE which wants to perform the uplink transmission in the time unit may detect the UL grant at the specific frequency-domain position on the first symbol in the time unit. Upon the acquisition of the UL grant, the target UE may parse the UL grant, acquire the scheduling information corresponding to the target UE in accordance with a bit field for identifying the target UE, and perform the uplink transmission on the scheduled time-domain and frequency-domain resources.

Second Example

Figure 9:
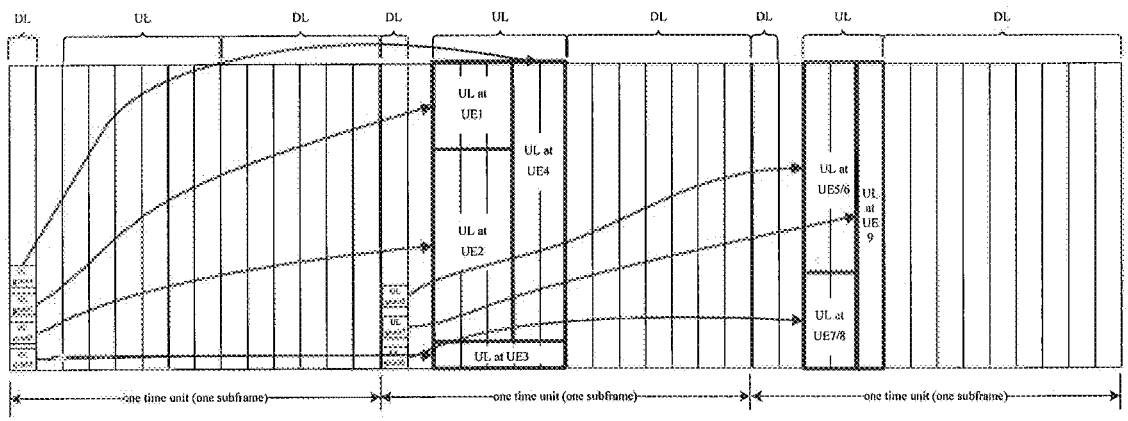
FIG. 9 is a schematic view showing a principle of a second example of the uplink transmission method according to one embodiment of the present disclosure.

Taking one time unit having a length of 1 ms (i.e., one LTE subframe) as an example, the UL granted transmitted in one time unit is used to schedule the uplink transmission within the uplink transmission time period in a next time unit. The UL grant is pro-defined or preconfigured to be transmitted at a specific frequency-domain position (e.g., K2 SCs, REs or RUs on a mediate, low-frequency or high-frequency domain, or K2 SCs, REs or RUs dispersed within the downlink transmission bandwidth) on a first symbol in a time unit. As shown in FIG. 9, the base station may transmit the UL grant at a specific frequency-domain position on a first symbol in a time unit. Each target UE which wants to perform the uplink transmission in a next time unit may detect the UL grant at a specific frequency-domain position on a first symbol in a current time unit. Upon the acquisition of the UL grant, the target UE may parse the UL grant, acquire the scheduling information corresponding to the target UE in accordance with a bit field for identifying the target UE, and perform the uplink transmission on the time-domain and frequency-domain resources scheduled in a next time unit.

Third Example

Figure 10:
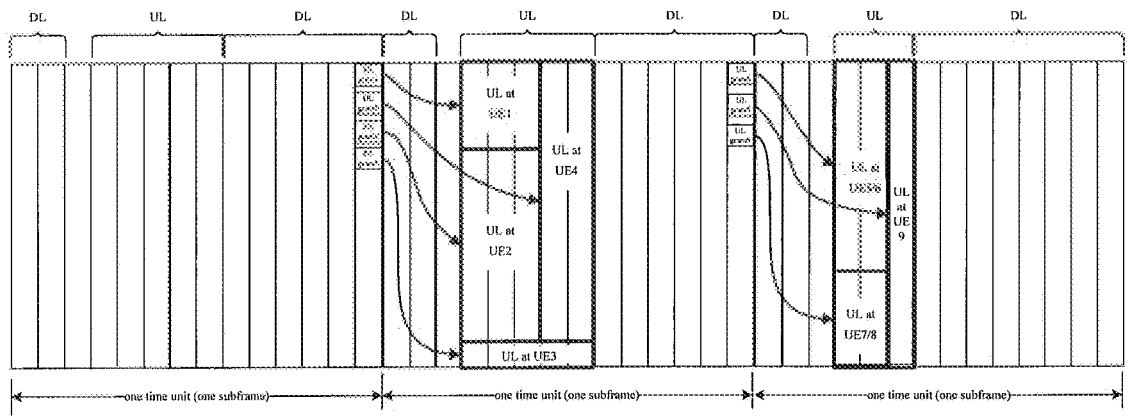
FIG. 10 is a schematic view showing a principle of a third example of the uplink transmission method according to one embodiment of the present disclosure.

Taking one time unit having a length of 1 ms (i.e., one LTE subframe) as an example, the UL granted transmitted in a time unit is used to schedule the uplink transmission within the uplink transmission time period in a next time unit. The UL grant is pre-agreed or preconfigured to be transmitted at a specific frequency-domain position (e.g., K2 SCs, REs or RUs on a mediate, low-frequency or high-frequency domain, or K2 SCs, REs or RUs dispersed within the downlink transmission bandwidth) on a last symbol in a time unit or a last symbol within a last downlink transmission time period. As shown in FIG. 10, the base station may transmit the UL grant at a specific frequency-domain position on a last symbol in a time unit. Each target UE which wants to perform the uplink transmission in a next time unit may detect the UL grant at a specific frequency-domain position on a last symbol in a current time unit. Upon the acquisition of the UL grant, the target UE may parse the UL grant, acquire the scheduling information corresponding to the target UE in accordance with a bit field for identifying the target UE, and perform the uplink transmission on the time-domain and frequency-domain resources scheduled in the next time unit.

Fourth Example

Figure 11:
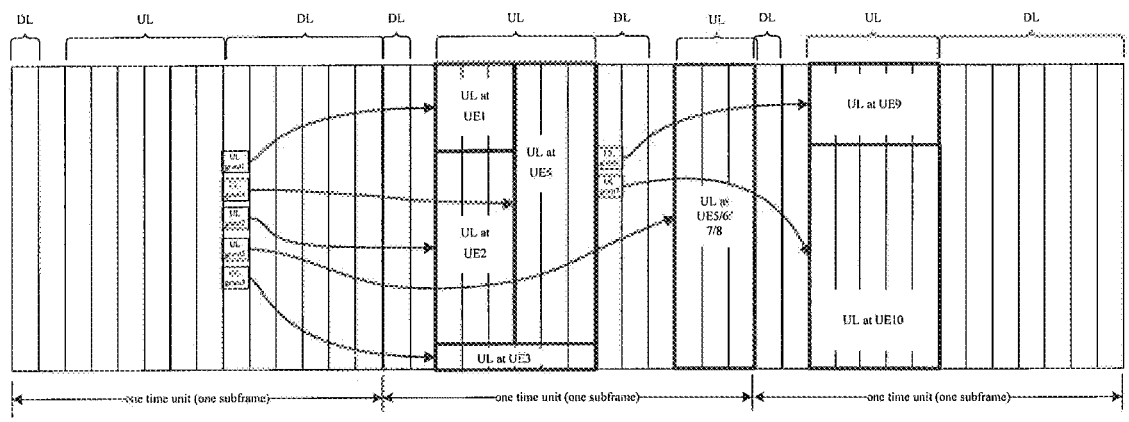
FIG. 11 is a schematic view showing a principle of a fourth example of the uplink transmission method according to one embodiment of the present disclosure.

Taking one time unit having a length of 1 ms (i.e., one LTE subframe) as an example, the UL granted transmitted in a time unit is used to schedule the uplink transmission within the uplink transmission time period in a next time unit, including all the uplink transmission for the UE on the uplink transmission resource. The UL grant is pre-defined or preconfigured to be transmitted at a specific frequency-domain position (e.g., K2 SCs, REs or RUs on a mediate, low-frequency or high-frequency domain, or K2 SCs, REs or RUs dispersed within the downlink transmission bandwidth) on a first symbol within a last downlink transmission time period in an interval. As shown in FIG. 11, the base station may transmit the UL grant at a specific frequency-domain position on a first symbol within a last downlink transmission time period in an interval. Each target UE which wants to perform the uplink transmission in a next time unit may detect the UL grant at a specific frequency-domain position on a first symbol within a last downlink transmission time period in a current time unit. Upon the acquisition of the UL grant, the target UE may parse the UL grant, acquire the scheduling information corresponding to the target UE in accordance with a bit field for identifying the target UE, and perform the uplink transmission on the time-domain and frequency-domain resources scheduled in the next time unit.

Based on the above examples, if the number of the UEs to be scheduled in a time unit is relatively large and there are insufficient scheduled uplink transmission resources to support the uplink transmission for each UE on the separate time-domain/frequency-domain resources, the UEs may be grouped in advance. The scheduling information for the UEs in one group may be transmitted in one UL grant, and the scheduling information for the UEs in different groups may be transmitted in different UL grants. The correspondence between the UL grants and the groups of UEs may be determined in accordance with a UE identifier field, accessory information or a scrambling sequence contained in each UL grant. Each UE may detect the UE identifier field, the accessory information or the scrambling sequence in a blind manner, so as to determine the UL grant in which the scheduling information for the UE itself is contained. The implementation thereof is similar to that mentioned above, which will not be particularly defined herein.

Further, if a specific sequence is further carried in the uplink information transmitted from the UE, this specific sequence may be detected by any other UE in a cell A where the UE is currently located, so as to assist the synchronous transmission between the UE and the other UE, thereby to facilitate the UE-to-UE communication. This specific sequence may also be detected by a UE and/or a base station in a neighboring cell, so as to determine whether or not there are resources on which the uplink transmission for the UEs in the cell A is performed. In addition, a signal strength may be measured in accordance with this specific sequence, so as to acquire the interference of the any other UE in the cell A relative to the UE itself, thereby to provide prior information for the subsequent interference coordination and interference cancellation with respect to the interference caused by uplink data on the UE itself.

In a word, according to the second embodiment of the present disclosure, the UL grant is transmitted at a specific position in a time unit, so as to schedule, in a centralized manner, the uplink transmission for all the UEs in the current or next time unit. As a result, it is able for the network side to schedule the UE in a coordinated manner, thereby to reduce the times of blind detection on uplink scheduling signaling by the UE, and improve the transmission efficiency.

Third Embodiment

Figure 12:
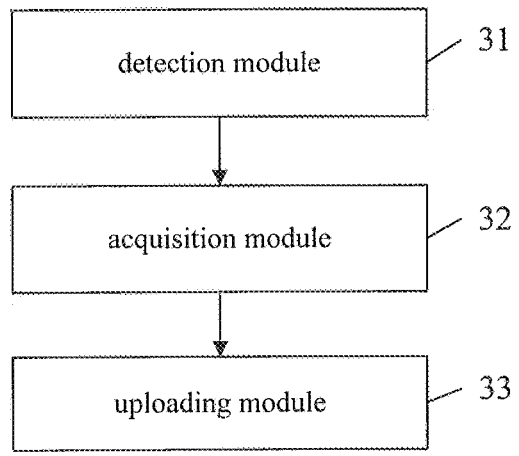
FIG. 12 is a schematic view showing an uplink transmission device according to a third embodiment of the present disclosure.

As shown in FIG. 12, the present disclosure further provides in this embodiment an uplink transmission device, including: a detection module 31 configured to detect an UL grant on each target time-domain resource and each target frequency-domain resource in a first time unit, the UL grant being used to schedule one or more UEs to perform uplink transmission in a target time unit, a time unit having a predefined length of B1 subframes or B2 symbols, where B1 and B2 are each an integer greater than or equal to 1; an acquisition module 32 configured to acquire scheduling information for the UE in the target time unit from the UL grant; and an uploading module 33 configured to perform the uplink transmission on a time-domain resource and a frequency-domain resource scheduled in the target time unit in accordance with the scheduling information.

To be specific, the acquisition module includes: a first acquisition sub-module configured to process appendix information in the UL grant, so as to determine whether or not the UL grant contains the scheduling information for the UE; and a second acquisition sub-module configured to, if the UL grant contains the scheduling information for the UE, acquire the scheduling information for the UE in the target time unit from the UL grant.

To be specific, the appendix information in the UL grant is a predetermined information field in the UL grant and configured to indicate a UE identifier or UE identifiers of the one or more UEs scheduled by the UL grant, or the appendix information in the UL grant is scrambling information for the UL grant, or the appendix information in the UL grant is a first predetermined sequence carried before the UL grant and corresponding to each UE identifier. A correspondence between the first predetermined sequence and the UE identifier is pre-defined or pre-configured.

To be specific, each target time-domain resource is a predetermined symbol position in the first time unit, and the predetermined symbol position contains one or more symbols.

To be specific, the predetermined symbol position includes an $a^{th}$ symbol or an $a^{th}$ last symbol, where a is an integer greater than or equal to 1; or the predetermined symbol position contains K1 consecutive symbols starting from the $a^{th}$ symbol or the a last symbol, where a is an integer greater than or equal to 1, and K1 is an integer greater than or equal to 1.

When the first time unit contains one downlink transmission resource region, the predetermined symbol position is a first symbol or a last symbol in the downlink transmission resource region, or the predetermined symbol position contains K1 consecutive symbols starting from the first symbol or the last K1 symbols in the downlink transmission resource region, where K1 is an integer greater than or equal to 1.

When the first time unit contains a plurality of downlink transmission resource regions, the predetermined symbol position is a first symbol or a last symbol in a first or last downlink transmission resource region, or the predetermined symbol position contains K1 consecutive symbols starting from the first symbol or the last K symbols in the first or last downlink transmission resource region, where K1 is an integer greater than or equal to 1. The downlink transmission resource region is a resource region allocated in advance in the first time unit for downlink transmission.

To be specific, each target frequency-domain resource is a predetermined subcarrier position or a predetermined resource unit position in frequency domain, the predetermined subcarrier position contains one or more subcarriers, the predetermined resource unit position contains one or more resource units, each resource unit is a resource region including X1 symbols in time domain and X2 consecutive or inconsecutive subcarriers in frequency domain, where X1 and X2 are each an integer greater than or equal to 1.

To be specific, the target frequency-domain resources are consecutive on the frequency domain, or the target frequency-domain resources are evenly distributed in frequency domain within a system bandwidth or a bandwidth corresponding to the downlink transmission in accordance with a predetermined granularity, or the target frequency-domain resources are at a highest-frequency position, a lowest-frequency position or a mediate-frequency position within the system bandwidth or the bandwidth corresponding to the downlink transmission.

To be specific, the target time-domain resources and the target frequency-domain resources are pre-defined or configured through signaling.

To be specific, the target time unit is pre-defined or configured through signaling. The target time unit is one of the following time unit: the first time unit, a time unit immediately following the first time unit, a $k^{th}$ time unit following the first time unit, an earliest time unit containing an uplink transmission resource and meeting a processing time delay for the UL grant starting from or immediately following the first time unit, where k is an integer greater than 1.

To be specific, the uplink transmission device further includes an interference measurement module configured to carry a second predetermined sequence when performing the uplink transmission on the time-domain resource and the frequency-domain resource scheduled in the target time unit, so that the other UE and/or a base station is capable of performing interference measurement on the UE in accordance with the second predetermined sequence. The second predetermined sequence is related to the UE identifier.

It should be appreciated that, the uplink transmission device in the third embodiment of the present disclosure corresponds to the uplink transmission method at the UE side in the first embodiment, so the implementation of the uplink transmission device may refer to that mentioned in the above, with same or similar beneficial effects.

Fourth Embodiment

The present disclosure further provides in this embodiment an uplink transmission device, including: a processor, and a memory connected to the processor via a bus interface and configured to store therein programs and data for the operation of the processor. The processor is configured to call and execute the programs and data stored in the memory, so as to achieve functions of: a detection module configured to detect an UL grant on each target time-domain resource and each target frequency-domain resource in a first time unit, the UL grant being used to schedule one or more UEs to perform uplink transmission in a target time unit, a time unit having a predefined length of B1 subframes or B2 symbols, where B1 and B2 are each an integer greater than or equal to 1; an acquisition module configured to acquire scheduling information for the UE in the target time unit from the UL grant; and an uploading module configured to perform the uplink transmission on a time-domain resource and a frequency-domain resource scheduled in the target time unit in accordance with the scheduling information.

It should be appreciated that, the uplink transmission device in the fourth embodiment of the present disclosure corresponds to the uplink transmission method at the UE side in the first embodiment, so the implementation of the uplink transmission device may refer to that mentioned in the above, with identical or similar beneficial effects.

Fifth Embodiment

Figure 13:
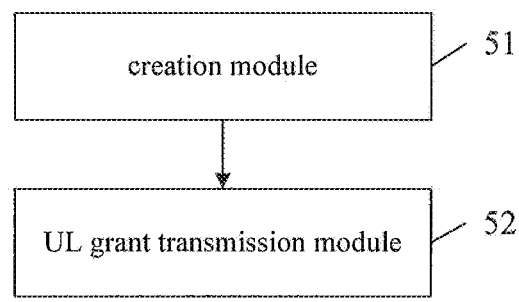
FIG. 13 is a schematic view showing another uplink transmission device according to a fifth embodiment of the present disclosure.

As shown in FIG. 13, the present disclosure further provides in this embodiment an uplink transmission device, including: a creation module 51 configured to create one or more UL grants, each UL grant being used to schedule one or more UEs to perform uplink transmission in a target time unit; and an UL grant transmission module 52 configured to transmit the UL grants on a target time-domain resource and a target frequency-domain resource in a first time unit, the time unit having a predefined length of B1 subframes or B2 symbols, where B1 and B2 are each an integer greater than or equal to 1.

To be specific, the uplink transmission device further includes a configuration module configured to set appendix information in each UL grant, and the appendix information is to indicate whether or not the UL grant contains scheduling information for the UE. The appendix information is a predetermined information field in the UL grant that contains a UE identifier or UE identifiers of the one or more UEs scheduled by the UL grant, or the appendix information is scrambling information for the UL grant, or the appendix information is a first predetermined sequence carried before the UL grant and corresponding to each UE identifier. A correspondence between the first predetermined sequence and the UE identifier is pre-defined or pre-configured.

To be specific, each target time-domain resource is a predetermined symbol position in the first time unit, and the predetermined symbol position contains one or more symbols.

To be specific, the predetermined symbol position includes an $a^{th}$ symbol or an $a^{th}$ last symbol, where a is an integer greater than or equal to 1; or the predetermined symbol position contains K1 consecutive symbols starting from the $a^{th}$ symbol or the $a^{th}$ last symbol, where a is an integer greater than or equal to 1, and K1 is an integer greater than or equal to 1. When the first time unit contains one downlink transmission resource region, the predetermined symbol position is a first symbol or a last symbol in the downlink transmission resource region, or the predetermined symbol position contains K1 consecutive symbols starting from the first symbol or the last K1 symbols in the downlink transmission resource region, where K1 is an integer greater than or equal to 1. When the first time unit contains a plurality of downlink transmission resource regions, the predetermined symbol position is a first symbol or a last symbol in a first or last downlink transmission resource region, or the predetermined symbol position contains K1 consecutive symbols starting from the first symbol or the last K1 symbols in the first or last downlink transmission resource region, where K1 is an integer greater than or equal to 1. The downlink transmission resource region is a resource region allocated in advance in the first time unit for downlink transmission.

To be specific, each target frequency-domain resource is a predetermined subcarrier position or a predetermined resource unit position in frequency domain, the predetermined subcarrier position contains one or more subcarriers, the predetermined resource unit position contains one or more resource units, each resource unit is a resource region comprising X1 symbols in time domain and X2 consecutive or inconsecutive subcarriers in frequency domain, where X1 and X2 are each an integer greater than or equal to 1.

To be specific, the target frequency-domain resources are consecutive on the frequency domain, or the target frequency-domain resources are evenly distributed in frequency domain within a system bandwidth or a bandwidth corresponding to the downlink transmission in accordance with a predetermined granularity, or the target frequency-domain resources are at a highest-frequency position, a lowest-frequency position or a mediate-frequency position within the system bandwidth or the bandwidth corresponding to the downlink transmission.

To be specific, the target time-domain resources and the target frequency-domain resources are pre-defined or configured through signaling.

To be specific, the target time unit is pre-defined or configured through signaling. The target time unit is one of the following time unit: the first time unit, a time unit immediately following the first time unit, a $k^{th}$ time unit following the first time unit, a earliest time unit containing an uplink transmission resource and meeting a processing time delay for the UL grant starting from or immediately following the first time unit, where k is an integer greater than 1.

It should be appreciated that, the uplink transmission device in the fifth embodiment of the present disclosure corresponds to the uplink transmission method at the base station side in the second embodiment, so the implementation of the uplink transmission device may refer to that mentioned in the above, with same or similar beneficial effects.

Sixth Embodiment

The present disclosure further provides in this embodiment an uplink transmission device, including a processor, and a memory connected to the processor via a bus interface and configured to store therein programs and data for the operation of the processor. The processor is configured to call and execute the programs and data stored in the memory, so as to achieve functions of: a creation module configured to create one or more UL grants, each UL grant being used to schedule one or more UEs to perform uplink transmission in a target time unit; and an UL grant transmission module configured to transmit the UL grants on a target time-domain resource and a target frequency-domain resource in a first time unit, the time unit having a predefined length of B1 subframes or B2 symbols, where B1 and B2 are each an integer greater than or equal to 1.

It should be appreciated that, the uplink transmission device in the sixth embodiment of the present disclosure corresponds to the uplink transmission method at the base station side in the second embodiment, so the implementation of the uplink transmission device may refer to that mentioned in the above, with same or similar beneficial effects.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An uplink transmission method, comprising:
   detecting an Uplink (UL) grant on a target time-domain resource and a target frequency-domain resource in a first time unit, the UL grant being to schedule one or more User Equipments (UEs) to perform uplink transmission in a target time unit, a time unit having a predefined length of B2 symbols, where B2 is an integer greater than or equal to 1;
   acquiring scheduling information for the UE in the target time unit from the UL grant, wherein the scheduling information comprises information for indicating a time-domain resource and a frequency-domain resource; and
   performing the uplink transmission on the time-domain resource and the frequency-domain resource scheduled in the target time unit in accordance with the scheduling information;
   wherein the acquiring the scheduling information for the UE in the target time unit from the UL grant comprise: processing appendix information in the UL grant determining whether the UL grant contains the scheduling information for the UE; and when the UL grant contains the scheduling information for the UE, acquiring the scheduling information for the UE in the target time unit from the UL grant.

2. The uplink transmission method according to claim 1, wherein the appendix information in the UL grant is a predetermined information field in the UL grant and the predetermined information field is to indicate UE identifier(s) of the one or more UEs scheduled by the UL grant, or
   the appendix information in the UL grant is scrambling information for the UL grant, or
   the appendix information in the UL grant is a first predetermined sequence carried before the UL grant and corresponding to the UE identifier,
   wherein a correspondence between the first predetermined sequence and the UE identifier is pre-defined or pre-configured.

3. The uplink transmission method according to claim 1, wherein the target time-domain resource is a predetermined symbol position in the first time unit, and the predetermined symbol position contains one or more symbols; and/or
   wherein the target frequency-domain resource is a predetermined subcarrier position or a predetermined resource unit position in frequency domain, the predetermined subcarrier position contains one or more subcarriers, the predetermined resource unit position contains one or more resource units, each resource unit is a resource region comprising X1 symbols in time domain and X2 consecutive or inconsecutive subcarriers in frequency domain, where X1 and X2 are each an integer greater than or equal to 1; and/or
   wherein the target time-domain resources and the target frequency-domain resources are pre-defined or configured through signaling; and/or
   wherein the target time unit is pre-defined or configured through signaling, and the target time unit is one of the following time unit: the first time unit, a time unit immediately following the first time unit, a $k^{th}$ time unit following the first time unit, an earliest time unit containing an uplink transmission resource and meeting a processing time delay for the UL grant starting from or immediately following the first time unit, where k is an integer greater than 1.

4. The uplink transmission method according to claim 3, wherein the predetermined symbol position is an $a^{th}$ symbol or an $a^{th}$ last symbol, where a is an integer greater than or equal to 1; or the predetermined symbol position contains K1 consecutive symbols starting from the $a^{th}$ symbol or the $a^{th}$ last symbol, where a is an integer greater than or equal to 1, and K1 is an integer greater than or equal to 1;
   and/or
   when the first time unit contains one downlink transmission resource region, the predetermined symbol position is a first symbol or a last symbol in the downlink transmission resource region, or the predetermined symbol position contains K1 consecutive symbols starting from the first symbol or the last K1 symbols in the downlink transmission resource region, where K1 is an integer greater than or equal to 1; and/or
   when the first time unit contains a plurality of downlink transmission resource regions, the predetermined symbol position is a first symbol or a last symbol in a first or last downlink transmission resource region, or the predetermined symbol position contains K1 consecutive symbols starting from the first symbol or the last K1 symbols in the first or last downlink transmission resource region, where K1 is an integer greater than or equal to 1;
   wherein the downlink transmission resource region is a resource region allocated in advance in the first time unit for downlink transmission.

5. The uplink transmission method according to claim 3, wherein the target frequency-domain resources are consecutive in frequency domain, or the target frequency-domain resources are evenly distributed in frequency domain within a system bandwidth or a bandwidth corresponding to the downlink transmission in accordance with a predetermined granularity, or the target frequency-domain resources are at a highest-frequency position, a lowest-frequency position or a mediate-frequency position within the system bandwidth or the bandwidth corresponding to the downlink transmission.

6. The uplink transmission method according to claim 1, further comprising carrying a second predetermined sequence when performing the uplink transmission on the time-domain resource and the frequency-domain resource scheduled in the target time unit, the other UE(s) and/or base station(s) is capable of performing interference measurement on the UE in accordance with the second predetermined sequence, wherein the second predetermined sequence is related to the UE identifier.

7. An uplink transmission method, comprising:
creating one or more Uplink (UL) grants, each UL grant being to schedule one or more User Equipments (UEs) to perform uplink transmission in a target time unit; and
transmitting the UL grants on a target time-domain resource and a target frequency-domain resource in a first time unit, the time unit having a predefined length of B2 symbols, where B2 is an integer greater than or equal to 1;
wherein the uplink transmission method further comprises: setting appendix information in each UL grant, wherein the appendix information is to indicate whether the UL grant contains scheduling information for the UE.

8. The uplink transmission method according to claim 7, wherein:
the appendix information is a predetermined information field in the UL grant and the predetermined information field contains UE identifier(s) of the one or more UEs scheduled by the UL grant; or
the appendix information is scrambling information for the UL grant; or
the appendix information is a first predetermined sequence carried before the UL grant and corresponding to each UE identifier, wherein a correspondence between the first predetermined sequence and the UE identifier is pre-defined or pre-configured.

9. The uplink transmission method according to claim 7, wherein the target time-domain resource is a predetermined symbol position in the first time unit, and the predetermined symbol position contains one or more symbols; and/or
wherein the target frequency-domain resource is a predetermined subcarrier position or a predetermined resource unit position in frequency domain, the predetermined subcarrier position contains one or more subcarriers, the predetermined resource unit position contains one or more resource units, each resource unit is a resource region comprising X1 symbols in time domain and X2 consecutive or inconsecutive subcarriers in frequency domain, where X1 and X2 are each an integer greater than or equal to 1; and/or
wherein the target time-domain resources and the target frequency-domain resources are pre-defined or configured through signaling; and/or
wherein the target time unit is pre-defined or configured through signaling, and the target time unit is one of the following time unit: the first time unit, a time unit immediately following the first time unit, a $k^{th}$ time unit following the first time unit, a earliest time unit containing an uplink transmission resource and meeting a processing time delay for the UL grant starting from or immediately following the first time unit, where k is an integer greater than 1.

10. The uplink transmission method according to claim 9, wherein the predetermined symbol position is an $a^{th}$ symbol or an $a^{th}$ last symbol, where a is an integer greater than or equal to 1; or the predetermined symbol position contains K1 consecutive symbols starting from the $a^{th}$ symbol or the $a^{th}$ last symbol, where a is an integer greater than or equal to 1, and K1 is an integer greater than or equal to 1;
and/or
when the first time unit contains one downlink transmission resource region, the predetermined symbol position is a first symbol or a last symbol in the downlink transmission resource region, or the predetermined symbol position contains K1 consecutive symbols starting from the first symbol or the last K1 symbols in the downlink transmission resource region, where K1 is an integer greater than or equal to 1; and/or
when the first time unit contains a plurality of downlink transmission resource regions, the predetermined symbol position is a first symbol or a last symbol in a first or last downlink transmission resource region, or the predetermined symbol position contains K1 consecutive symbols starting from the first symbol or the last K1 symbols in the first or last downlink transmission resource region, where K1 is an integer greater than or equal to 1;
wherein the downlink transmission resource region is a resource region allocated in advance in the first time unit for downlink transmission.

11. The uplink transmission method according to claim 9, wherein:
the target frequency-domain resources are consecutive in frequency domain; or
the target frequency-domain resources are evenly distributed in frequency domain within a system bandwidth or a bandwidth corresponding to the downlink transmission in accordance with a predetermined granularity; or
the target frequency-domain resources are at a highest-frequency position, a lowest-frequency position or a mediate-frequency position within the system bandwidth or the bandwidth corresponding to the downlink transmission.

12. An uplink transmission device, comprising a processor, and a memory connected to the processor via a bus interface and configured to store therein programs and data for the operation of the processor, wherein the processor is configured to call and execute the programs and data stored in the memory, to achieve functions of:
a detection module configured to detect an Uplink (UL) grant on a target time-domain resource and a target frequency-domain resource in a first time unit, the UL grant being to schedule one or more User Equipments (UEs) to perform uplink transmission in a target time unit, a time unit having a predefined length of B2 symbols, where B2 is an integer greater than or equal to 1;
an acquisition module configured to acquire scheduling information for the UE in the target time unit from the UL grant, wherein the scheduling information comprises information for indicating a time-domain resource and a frequency-domain resource; and
an uploading module configured to perform the uplink transmission on the time-domain resource and the frequency-domain resource scheduled in the target time unit in accordance with the scheduling information;
wherein the acquisition module comprises: a first acquisition sub-module configured to process appendix information in the UL grant, and determine whether the UL grant contains the scheduling information for the UE; and a second acquisition sub-module configured to, when the UL grant contains the scheduling information for the UE, acquire the scheduling information for the UE in the target time unit from the UL grant.

13. The uplink transmission device according to claim 12, wherein the appendix information in the UL grant is a predetermined information field in the UL grant and the predetermined information field is to indicate UE identifier(s) of the one or more UEs scheduled by the UL grant, or the appendix information in the UL grant is scrambling information for the UL grant, or the appendix information in the UL grant is a first predetermined sequence carried before the UL grant and corresponding to the UE identifier, wherein a correspondence between the first predetermined sequence and the UE identifier is pre-defined or pre-configured.

14. The uplink transmission device according to claim 12, wherein the target time-domain resource is a predetermined symbol position in the first time unit, and the predetermined symbol position contains one or more symbols; and/or wherein the target frequency-domain resource is a predetermined subcarrier position or a predetermined resource unit position in frequency domain, the predetermined subcarrier position contains one or more subcarriers, the predetermined resource unit position contains one or more resource units, each resource unit is a resource region comprising X1 symbols in time domain and X2 consecutive or inconsecutive subcarriers in frequency domain, where X1 and X2 are each an integer greater than or equal to 1; and/or wherein the target time-domain resources and the target frequency-domain resources are pre-defined or configured through signaling; and/or wherein the target time unit is pre-defined or configured through signaling, and the target time unit is one of the following time unit: the first time unit, a time unit immediately following the first time unit, a $k^{th}$ time unit following the first time unit, an earliest time unit containing an uplink transmission resource and meeting a processing time delay for the UL grant starting from or immediately following the first time unit, where k is an integer greater than 1.

15. The uplink transmission device according to claim 14, wherein the predetermined symbol position is an $a^{th}$ symbol or an $a^{th}$ last symbol, where a is an integer greater than or equal to 1; or the predetermined symbol position contains K1 consecutive symbols starting from the $a^{th}$ symbol or the $a^{th}$ last symbol, where a is an integer greater than or equal to 1, and K1 is an integer greater than or equal to 1;

and/or when the first time unit contains one downlink transmission resource region, the predetermined symbol position is a first symbol or a last symbol in the downlink transmission resource region, or the predetermined symbol position contains K1 consecutive symbols starting from the first symbol or the last K1 symbols in the downlink transmission resource region, where K1 is an integer greater than or equal to 1; and/or when the first time unit contains a plurality of downlink transmission resource regions, the predetermined symbol position is a first symbol or a last symbol in a first or last downlink transmission resource region, or the predetermined symbol position contains K1 consecutive symbols starting from the first symbol or the last K1 symbols in the first or last downlink transmission resource region, where K1 is an integer greater than or equal to 1;

wherein the downlink transmission resource region is a resource region allocated in advance in the first time unit for downlink transmission.

16. The uplink transmission device according to claim 14, wherein the target frequency-domain resources are consecutive in frequency domain, or the target frequency-domain resources are evenly distributed in frequency domain within a system bandwidth or a bandwidth corresponding to the downlink transmission in accordance with a predetermined granularity, or the target frequency-domain resources are at a highest-frequency position, a lowest-frequency position or a mediate-frequency position within the system bandwidth or the bandwidth corresponding to the downlink transmission.

17. The uplink transmission device according to claim 12, further comprising an interference measurement module configured to carry a second predetermined sequence when performing the uplink transmission on the time-domain resource and the frequency-domain resource scheduled in the target time unit, the other UE(s) and/or base station(s) is capable of performing interference measurement on the UE in accordance with the second predetermined sequence, wherein the second predetermined sequence is related to the UE identifier.

18. An uplink transmission device, comprising a processor, and a memory connected to the processor via a bus interface and configured to store therein programs and data for the operation of the processor, wherein the processor is configured to call and execute the programs and data stored in the memory, so as to achieve functions of: a creation module configured to create one or more UL grants, each UL grant being to schedule one or more UEs to perform uplink transmission in a target time unit; and an UL grant transmission module configured to transmit the UL grants on a target time-domain resource and a target frequency-domain resource in a first time unit, the time unit having a predefined length of B2 symbols, where B2 is an integer greater than or equal to;

wherein the processor is further configured to call and execute the programs and data stored in the memory so as to achieve functions of: a configuration module configured to set appendix information in each UL grant, wherein the appendix information is to indicate whether the UL grant contains scheduling information for the UE.

* * * * *